(12) United States Patent
Chang et al.

(10) Patent No.: US 9,361,547 B2
(45) Date of Patent: Jun. 7, 2016

(54) ELECTRONIC DEVICE PROVIDING DATA PROTECTION FOR INSERTED SMARTCARD

(71) Applicant: HON HAI PRECISION INDUSTRY CO., LTD., New Taipei (TW)

(72) Inventors: Wei-Min Chang, New Taipei (TW); Pei-Yu Hung, New Taipei (TW); Kuang-Sung Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/469,794

(22) Filed: Aug. 27, 2014

(65) Prior Publication Data

US 2015/0064947 A1 Mar. 5, 2015

(30) Foreign Application Priority Data

Aug. 29, 2013 (TW) .............................. 102130979 A

(51) Int. Cl.
*H01R 13/62* (2006.01)
*G06K 13/08* (2006.01)
*H04B 1/3818* (2015.01)

(52) U.S. Cl.
CPC ............ *G06K 13/085* (2013.01); *H04B 1/3818* (2015.01)

(58) Field of Classification Search
CPC ............. H01R 13/447; H01R 13/5213; H01R 2103/00; H01R 13/7032; H01R 13/4536
USPC ................. 439/490, 142, 911, 188; 200/50.1, 200/50.14, 50.12
See application file for complete search history.

(56) References Cited

U.S. PATENT DOCUMENTS

| 4,774,399 | A  | * | 9/1988  | Fujita ..................... G06K 7/006 235/441 |
| 6,602,096 | B1 | * | 8/2003  | Kronestedt .......... G06K 7/0021 439/188 |
| 7,059,910 | B1 |   | 6/2006  | Chang |
| 7,110,653 | B2 | * | 9/2006  | Sobel ................... G02B 6/4201 385/135 |
| 7,121,888 | B2 | * | 10/2006 | Brandt ................. H01R 13/512 439/248 |
| 7,123,487 | B2 | * | 10/2006 | Saito .................. G06K 13/0875 361/726 |
| 7,607,200 | B2 |   | 10/2009 | Chang |
| 7,920,782 | B2 |   | 4/2011  | Fujii |
| 8,662,905 | B2 | * | 3/2014  | Chang ................. H01R 13/447 439/142 |

FOREIGN PATENT DOCUMENTS

| TW | M280571 U | 11/2005 |
| TW | M289961 U | 4/2006 |
| TW | M302077 U | 12/2006 |
| TW | I272049 B | 1/2007 |
| TW | I288597 B | 10/2007 |

\* cited by examiner

*Primary Examiner* — Phuong Dinh

(74) *Attorney, Agent, or Firm* — Novak Druce Connolly Bove + Quigg LLP

(57) ABSTRACT

An electronic device includes a housing for safely breaking electronic communication with a smart card on removal from the electronic device. A safeguard structure rotates with respect to the housing to cover the smart card when inserted, and a switch breaks communication between the smart card and the electronic device when the safeguard structure is rotated away from the housing to enable removal of the smart card. The breaking of communication safely prevents damage to, or corruption of, data in the smart card upon removal from the electronic device.

5 Claims, 4 Drawing Sheets

ELECTRONIC DEVICE PROVIDING DATA PROTECTION FOR INSERTED SMARTCARD

FIELD

The present disclosure relates to data protection.

BACKGROUND

A smart card can be inserted into an electronic device for communicating with the electronic device, to write and read data. Examples of smart cards can include contact smart cards such as SIM cards. However, when the smart card is detached or removed from the electronic device, the data stored in the smart card can become corrupted.

BRIEF DESCRIPTION OF THE DRAWINGS

Implementations of the present technology will now be described, by way of example only, with reference to the attached figures.

DETAILED DESCRIPTION

Figure 1:
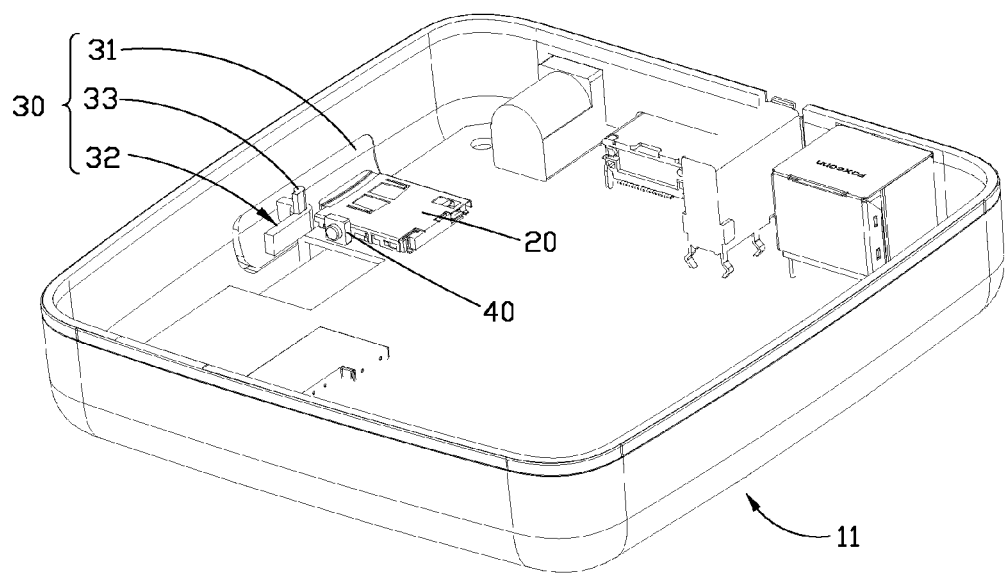
FIG. 1 is an isometric view of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "comprising," when utilized, means "including, but not necessarily limited to"; it specifically indicates open-ended inclusion or membership in the so-described combination, group, series and the like.

The present disclosure describes an electronic device.

Figure 2:
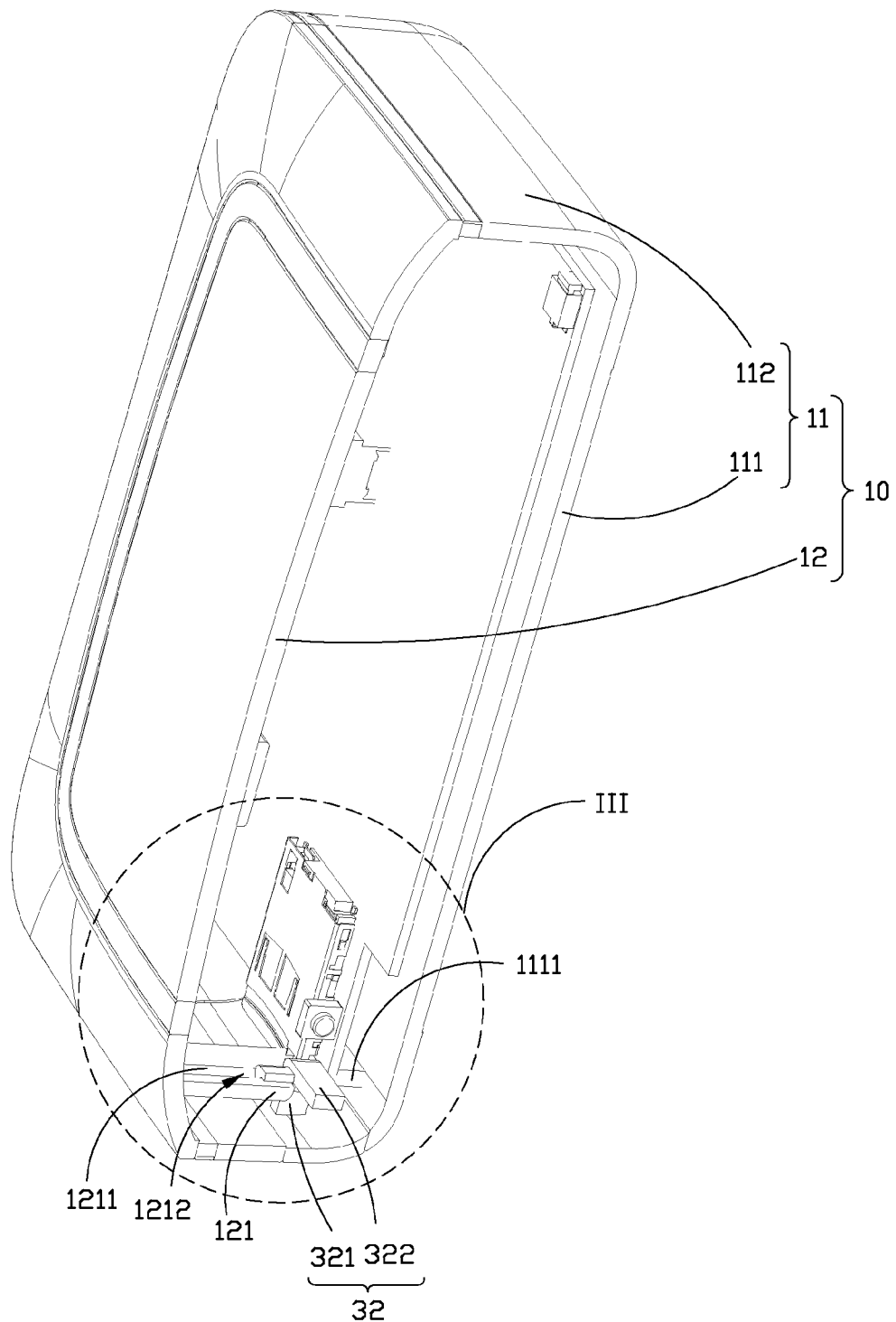
FIG. 2 is a cutaway view of the electronic device illustrated in FIG. 1 in a first state.
Figure 3:
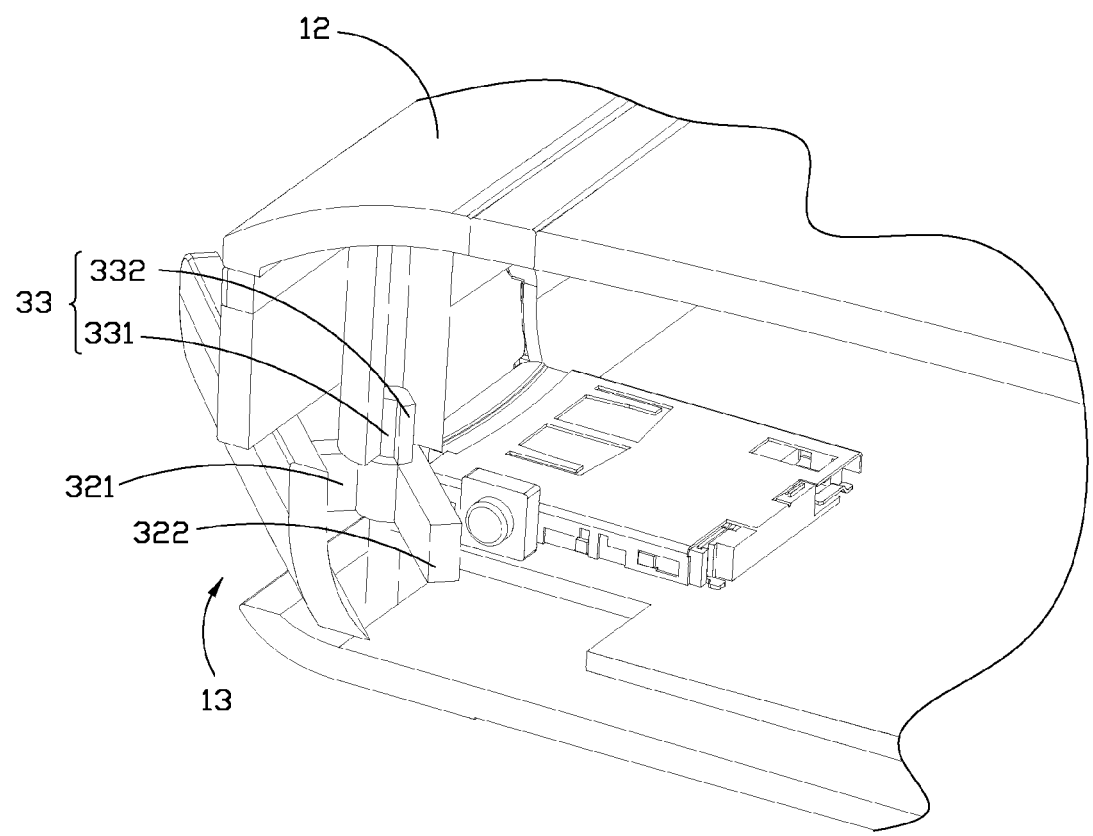
FIG. 3 is a view of circled portion III in FIG. 2 which shows the electronic device in a second state.

FIGS. 1 and 2 are two views of an electronic device 100 for receiving and communicating with a smart card 20. The smart card 20 can be any card having embedded integrated circuits, that can optionally be accessed via electrical contacts on the card, or can be accessed in a contactless manner. Examples of such smart cards 20 can include SIM cards for telephones, memory cards, and encryption or security cards. The electronic device 100 includes a housing 10, a safeguard structure 30, and a switch 40. An opening 13 (shown in FIG. 3) is defined in a sidewall of the housing 10 allowing the smart card 20 to be inserted into the housing 10. The switch 40 is detachably received in the housing 10 and makes and breaks the communication between the smart card 20 and the electronic device 100. The safeguard structure 30 is rotatably connected to the housing 10 for covering and uncovering the opening 13.

In the embodiment, the electronic device 100 may be a set-top box or other device requiring a smart card 20.

The housing 10 includes a top cover 12 and a bottom cover 11. The top cover 12 is assembled to connect or join with the bottom cover 11 to form a receiving space for receiving electronic components.

The top cover 12 is substantially a rectangular plate. A locating pin 121 protrudes downwards towards the bottom cover 11 from the top cover 12. The locating pin 121 is a pole or pillar-like structure, which defines a shaft hole 1211 and a limit groove 1212. The locating pin 121 has an inner wall surrounding the shaft hole 1211. The shaft hole 1211 runs through the central axis of the locating pin 121. The limit groove 1212 is defined in the inner wall and communicates with the shaft hole 1211.

The bottom cover 11 includes a base plate 111 and sidewall 112 protruding from edges of the base plate 111 towards the top cover 12. A rotating shaft 1111 protrudes from the base plate 111 towards the top cover 12. The opening 13 is defined in the sidewall 112. The smart card 20 is inserted into the housing 10 through the opening 13. The switch 40 makes electrical connections between the smart card 20 and the electronic device 100 when the smart card 20 is inserted into the housing 10.

The safeguard structure 30 can contact the switch 40 to break the communication between the smart card 20 and the electronic device 100. The safeguard structure 30 includes a door 31, a touching arm 32 located on the door 31, and a locating portion 33 located on the touching arm 32. The locating portion 33 is inserted in to the shaft hole 1211 to allow the door 31 to be rotated in relation to the housing 10.

The door 31 is a rectangular plate, and the door 31 includes a first surface facing the smart card 20. The touching arm 32 protrudes from the first surface of the door 31. The touching arm 32 is L-shaped and includes a joint portion 321 and a touching portion 322. The joint portion 321 perpendicularly protrudes towards the switch 40 from the first surface of the door 31, and the joint portion 321 has a first end away from the door 31. The touching portion 322 perpendicularly protrudes from the first end of the joint portion 321, and away from the switch 40, and the touching portion 322 is substantially parallel to the base plate 111. When the door 31 is rotated, the touching arm 32 rotates, allowing the touching portion 322 to make physical contact with the switch 40. In the embodiment, the touching portion 322 is buffered with an elastic member (not shown), which insulates the switch 40 from damage caused by overmovements or forceful movements of the door 31. In the embodiment, the joint portion 321 also can be buffered with an elastic member (not shown), such as a spring, the joint portion 321 is connected between the door 31 and the touching portion 322 to provide a buffer for the touching portion 322. In other embodiments, the touching arm 32 can be omitted, and it can be an end of the door 31 which makes physical contact with the switch 40 when the door 31 is opened.

The locating portion 33 includes a locating shaft 331 and a stop block 332 protruding from a periphery of the locating shaft 331. The locating shaft 331 is rotatably inserted into the shaft hole 1211. The locating shaft 331 is located on a joint of the joint portion 321 and the touching arm 32, and protrudes towards the top cover 12. In the embodiment, the locating shaft 331 is a pole or pillar-like structure. The stop block 332 protrudes outward from the periphery of the locating shaft 331.

In other embodiments, the electronic device 30 further includes an indicator light (not shown) and a sensor (not shown). The indicator light can be arranged on sidewall 112 or other location, surface, or component of the electronic device 30. When the safeguard structure 30 contacts the switch 40 to break the communication between the smart card 20 and the electronic device 100, the sensor detects and sends a control signal to light the indicator light. In the embodiment, the sensor can be a position sensor or a pressure sensor or the like. The indicator light is illuminated according to a position information detected by position sensor or a pressure value detected by pressure sensor, which indicates that the communication between the smart card 20 and the electronic device 100 smart card 20 is broken, and user can take out the smart card 20. In other embodiments, the indicator light can be a visual, audible, vibrating, or other type of alarm or warning device. The alarm or warning device is not necessarily limited to being included on the electronic device 30 and can be part of a separate device (not shown).

In assembly, the safeguard structure 30 is rotatably connected to the housing 10 by the rotating shaft 1111 being rotatably inserted into the touching arm 32. The top cover 12 is assembled together with the bottom cover 11, and the locating shaft 331 is rotatably inserted into the shaft hole 1211 and the stop block 332 is slidably received in the limit groove 1212. When the locating shaft 331 is rotated in the shaft hole 1211, the stop block 332 slides along the limit groove 1212 and regulates a rotation of the locating shaft 331, for regulating a rotation of the door 31 and the touching arm 32.

Figure 4:
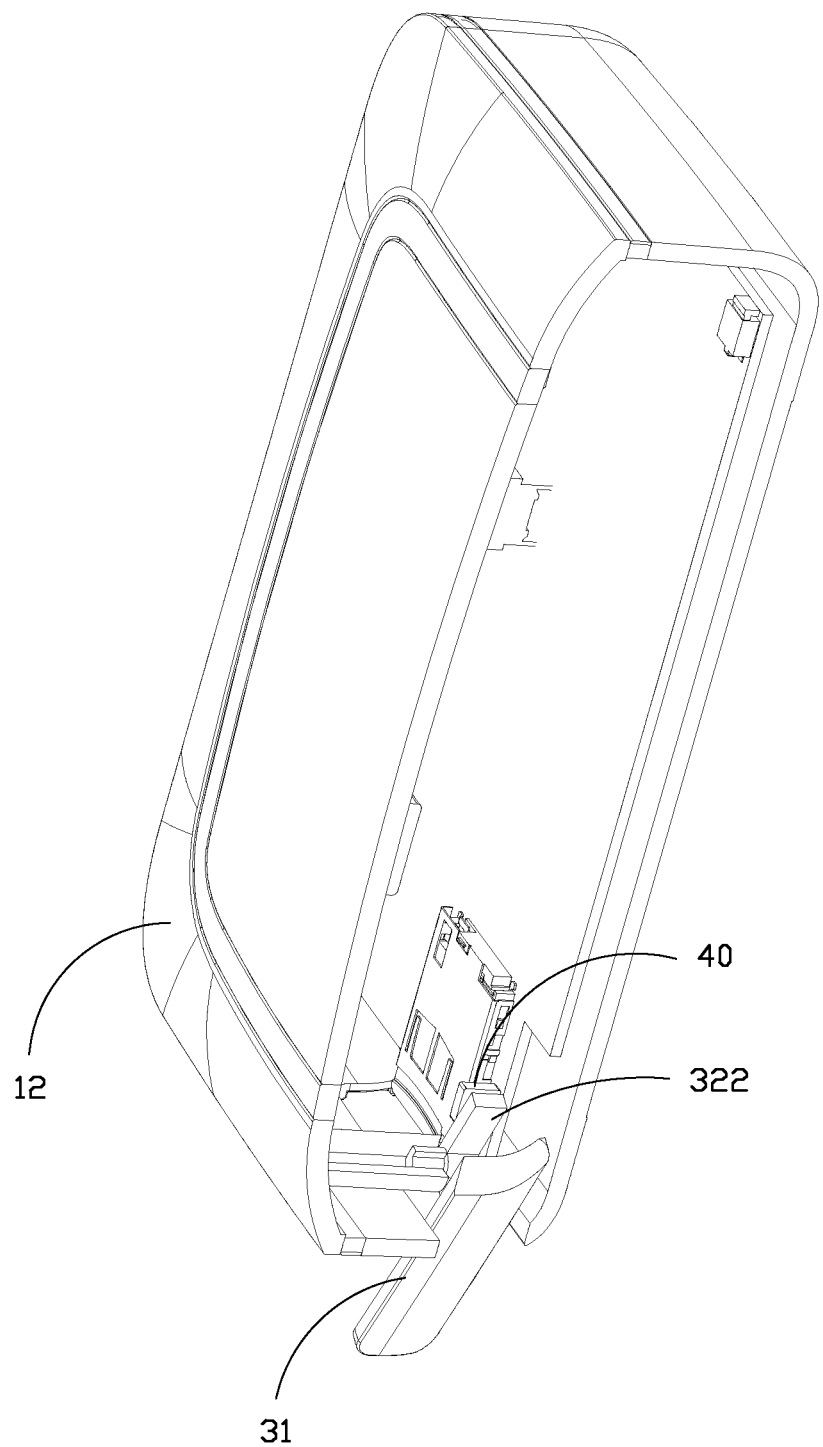
FIG. 4 is a cutaway view of the electronic device illustrated in FIG. 3 in a third state.

Referring to FIG. 4, in use, when the smart card 20 is to be inserted into the housing 10, the door 31 is rotated open, and the smart card 20 is inserted into the housing 10 from the opening 13, to connect to and communicate with the electronic device 100. When the smart card 20 needs to be taken out, the door 31 is rotated open and the touching portion 322 moves to make contact with the switch 40, which breaks the communication between the smart card 20 and the electronic device 100 The smart card 20 is then taken out from the opening 13.

Many details are often found in the art such as the other features of a shielding plate. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device for communicating with a smart card comprising:
 a housing defining an opening and receiving the smart card;
 a safeguard structure rotatably connected to the housing to cover or uncover the opening; and
 a switch received in the housing, wherein when the safeguard structure is rotated to uncover the opening, the safeguard structure contacts the switch to break a communication between the smart card and the electronic device, and wherein when the safeguard structure is rotated to cover the opening, the safeguard structure is separated from the switch to initiate the communication between the smart card and the electronic device;
 wherein the safeguard structure further comprises a door and a touching arm protruding from a first surface of the door facing the smart card, when the door is opened, the switch is contacted by the touching arm to break the communication between the smart card and the electronic device.

2. The electronic device of claim 1, wherein the touching arm comprises a joint portion and a touching portion, the joint portion protrudes from the first surface, the joint portion has a first end away from the door, and the touching portion protrudes from the first end, when the door is opened, the switch is contacted by the touching portion to break the communication between the smart card and the electronic device.

3. The electronic device of claim 2, wherein the housing comprises a top cover, and a locating pin protruding from the top cover towards the touching arm, a locating portion protrudes from the touching arm, the locating portion is inserted into the locating pin to allow the safeguard structure to be rotated respect to the housing.

4. The electronic device of claim 3, wherein the locating portion comprises a locating shaft protruding from the touching arm, and a stop block protruding from the locating shaft, the locating pin defines a shaft hole and a limit groove communicating with the shaft hole, the locating shaft is rotatably inserted into the shaft hole, the stop block received in the limit groove, when the locating shaft is rotated with respect to the locating pin, and the stop block is rotated with the locating shaft, and the stop block is stopped by the locating pin to prevent the locating shaft from being rotated when the locating shaft is rotated with the locating pin by an predetermined angle.

5. The electronic device of claim 4, wherein the housing comprises a bottom cover assembled to the top cover, a rotating shaft protruding from the bottom cover, an end of the rotating shaft away from the bottom cover is inserted into the touching arm, to allow the safeguard structure to be rotated respect to the housing.

* * * * *